(12) United States Patent
Purschwitz et al.

(10) Patent No.: US 9,452,689 B2
(45) Date of Patent: Sep. 27, 2016

(54) SEAT OCCUPANCY DETECTION DEVICE

(71) Applicant: Bayerische Motoren Werke Aktiengesellschaft, Munich (DE)

(72) Inventors: Arne Purschwitz, Munich (DE); Udo Rietschel, Munich (DE); Maximilian Meissner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/665,225

(22) Filed: Mar. 23, 2015

(65) Prior Publication Data

US 2015/0191105 A1    Jul. 9, 2015

Related U.S. Application Data

(63) Continuation of application No. PCT/EP2013/068460, filed on Sep. 6, 2013.

(30) Foreign Application Priority Data

Sep. 24, 2012  (DE) .................. 10 2012 217 140

(51) Int. Cl.
*B60R 22/00*  (2006.01)
*B60N 2/00*  (2006.01)
*B60N 2/56*  (2006.01)
(Continued)

(52) U.S. Cl.
CPC ............. *B60N 2/002* (2013.01); *B60N 2/5685* (2013.01); *B60R 16/02* (2013.01); *B60R 21/0154* (2014.10); *B60R 21/01532* (2014.10); *B62J 27/00* (2013.01); *B62J 33/00* (2013.01);
*G08B 21/22* (2013.01); *G08B 25/00* (2013.01); *B60R 2021/0088* (2013.01)

(58) Field of Classification Search
USPC .......................................................... 701/45
See application file for complete search history.

(56) References Cited

U.S. PATENT DOCUMENTS 5,525,843 A    6/1996  Hoewing
6,026,340 A *  2/2000  Corrado .................. B60N 2/002
                                                    280/735

(Continued)

FOREIGN PATENT DOCUMENTS

CN    101108595 A    1/2008
DE    43 38 285 A1   5/1995

(Continued)

OTHER PUBLICATIONS

International Search Report (PCT/ISA/210) dated Dec. 18, 2013, with English translation (Eight (8) pages).

(Continued)

*Primary Examiner* — Hussein A. Elchanti
(74) *Attorney, Agent, or Firm* — Crowell & Moring LLP

(57) ABSTRACT

A seat occupancy detection device for a vehicle, particularly for a motorcycle, has at least one electrode of a capacitor, which is arranged in a seat area and takes the form of a wire. The seat occupancy detection device includes an electronic unit connected to the wire, which unit has a function generator to generate an electrical signal, and an analyzer. The electrical signal generated by the function generator can be modified by occupation of the seat area. Further, an assistance system may activate or deactivate an assistance unit depending on the detection by the seat occupancy detection device.

15 Claims, 2 Drawing Sheets

(51) Int. Cl.
  B60R 16/02     (2006.01)
  B62J 27/00     (2006.01)
  B62J 33/00     (2006.01)
  B60R 21/015    (2006.01)
  G08B 21/22     (2006.01)
  G08B 25/00     (2006.01)
  B60R 21/00     (2006.01)

(56) References Cited

U.S. PATENT DOCUMENTS

| | | | |
|---|---|---|---|
| 2002/0113417 A1* | 8/2002 | Mattes | A41D 13/018 280/730.1 |
| 2004/0035630 A1 | 2/2004 | Lich et al. | |
| 2007/0069507 A1 | 3/2007 | Kobayashi et al. | |
| 2007/0096886 A1* | 5/2007 | Lich | G08B 25/016 340/436 |
| 2008/0011732 A1 | 1/2008 | Ito et al. | |
| 2008/0161158 A1 | 7/2008 | Kojima et al. | |
| 2009/0076686 A1 | 3/2009 | Schox et al. | |
| 2012/0248773 A1* | 10/2012 | Whinnery | F02N 11/0866 290/46 |
| 2014/0132042 A1* | 5/2014 | Midderhoff | A47C 7/748 297/180.12 |

FOREIGN PATENT DOCUMENTS

| | | |
|---|---|---|
| DE | 695 02 091 T2 | 10/1998 |
| DE | 102 23 366 A1 | 12/2003 |
| DE | 103 11 132 A1 | 9/2004 |
| DE | 10 2006 041 448 A1 | 3/2007 |
| DE | 10 2010 053 435 A1 | 6/2011 |
| DE | 10 2011 005 551 A | 9/2012 |
| GB | 2 322 956 A | 9/1998 |
| WO | WO 2012/123444 A1 | 9/2012 |

OTHER PUBLICATIONS

German Search Report dated Jan. 3, 2013, with English translation (Ten (10) pages).

BMWUR Admin: "BMW Motorcycle Technologies—ABS, RDC, ESA, and ASC", Nov. 11, 2010, XP002717626, http://www.bmwurbanriders.com/profiles/blogs/bmw-motorcycle-technologies, (Eight (8) pages).

Chinese Office Action issued in counterpart Chinese Application No. 201380047968.3 dated May 10, 2016 with English-language translation (seventeen (17) pages).

\* cited by examiner

SEAT OCCUPANCY DETECTION DEVICE

CROSS REFERENCE TO RELATED APPLICATIONS

This application is a continuation of PCT International Application No. PCT/EP2013/068460, filed Sep. 6, 2013, which claims priority under 35 U.S.C. §119 from German Patent Application No. 10 2012 217 140.1, filed Sep. 24, 2012, the entire disclosures of which are herein expressly incorporated by reference.

BACKGROUND AND SUMMARY OF THE INVENTION

The invention relates to a seat occupancy detection device for a motor vehicle, in particular for a motorcycle.

Seat occupancy detection devices are generally known from the automotive field, whereas they have not been used at all up to now in the case of two-wheeled vehicles. In the automotive sector, seat occupancy detection devices are used, for example, to monitor whether a person sitting on the seat is also wearing their seatbelt. Seat occupancy detection devices of this type usually have a weight sensor which is assigned to the seat area. When the seat area is occupied by a person, the weight sensor is correspondingly triggered owing to the weight of the person. A disadvantage of such seat occupancy detection devices is that the necessary components must be introduced into the seat to provide such a seat occupancy detection device, as a result of which the complexity in terms of construction increases. Another disadvantage of such a seat occupancy detection device is that the seat occupancy detection device also responds in the event of heavy objects being placed on the seat since the seat occupancy detection device reacts to the weight which acts on the corresponding seat area.

The problem addressed by the invention is therefore to provide an alternative seat occupancy detection device which reliably detects occupancy of the seat by a person.

The problem is solved by a seat occupancy detection device according to the invention for a motor vehicle, in particular for a motorcycle, having at least one electrode of a capacitor, which is arranged in a seat area and is embodied as a wire, an electronic assembly connected to the wire, which assembly has a function generator for generating an electrical signal and an evaluation unit, wherein the electrical signal generated by the function generator can be changed by occupancy of the seat area.

The basic concept of the invention is to effectively detect seat occupancy by a person, by using the capacitive properties of a person occupying the seat area and the parasitic capacitance of the wire. The occupancy of the seat area by a person corresponds to the connection of a capacitor to the electrical circuit, as a result of which the electrical signal generated by the function generator correspondingly changes. The person occupying the seat area is thus the mating electrode to the wire, as a result of which the capacitor is formed. The electrode of the capacitor is the wire and the mating electrode is defined through the person by the ground (reference potential) of the motor vehicle. The mating electrode can thus be produced, for example, by contact of the motor vehicle frame with the foot or similar.

The wire is preferably a part of a seat heating system, wherein the wire is a heating wire. This offers the advantage that no additional wire for the seat occupancy detection device needs to be introduced into the seat area in a complex manner. In addition, the wire of a seat heating system is arranged close to the seat area, as a result of which the detection field of the electrode is less disturbed.

Furthermore, in particular, the electronic assembly is likewise a part of the seat heating system, as a result of which no further electronic components need to be installed, provided a seat heating system is present. Thus, material can be saved and a seat occupancy detection device is retrofittable when a seat heating system is present.

The heating wire can alternately, preferably periodically alternately, have a heating current applied thereto and act as electrode of the capacitor. Owing to the alternating functions of the heating wire, it is ensured that the seat occupancy detection device, on the one hand, and the seat heating system on the other hand, effectively function alongside one another, with the result that correspondingly sufficient seat area heating is provided and the seat occupancy detection device is also available when the seat heating system is switched on.

In one embodiment, a switch, in particular a MOSFET switch, is assigned to the wire. This switch can interrupt the flow of current through the wire of the seat heating system, as a result of which the wire becomes the electrode. Thus, the wire can alternately act as heating wire and as electrode. Preferably, the switch is that one which activates and deactivates the seat heating system, with the result that no additional component is necessary.

In particular, an electronic controller is provided. The electronic controller can correspondingly switch the switch embodied as a MOSFET, with the result that the switch interrupts the flow of current through the wire owing to the actuation by the electronic circuit.

The electronic assembly preferably has a constant resistor, in particular a thin-film resistor. This resistor offers the advantage that the electrical signal which is generated by the function generator is damped such that the change in the electrical signal owing to the occupancy of the seat area and the connection of the capacitor has a relatively large effect.

In a particularly preferred embodiment, at least two wires, two electronic assemblies and two seat areas are provided, wherein in each case one wire and one electronic assembly are assigned to one seat area. This offers the advantage that two seat areas can be monitored in terms of their occupancy independently of one another, for example, in the case of a motorcycle, the driver's seat area and the pillion seat area.

Furthermore, the invention relates to an assistance system for a motor vehicle, in particular a motorcycle, having a seat occupancy detection device of the type mentioned above, wherein an electronic controller is provided. The electronic controller determines from electrical signals of the seat occupancy detection device whether the seat area is occupied and activates or deactivates an assistance unit depending on the occupancy. Therefore, it is possible to correspondingly control the motor vehicle and/or an assistance unit of the motor vehicle using the seat occupancy detection device, with the result that the motor vehicle can be better controlled or can assistively intervene in auxiliary systems.

In a preferred embodiment, the assistance unit is a chassis assistance unit. The chassis assistance unit can correspondingly adjust the chassis when a two-seat occupancy is detected, for example in the case of a motorcycle by the driver's seat area and the pillion seat area. In this case, the chassis assistance unit can be the ESA system.

In another embodiment, the assistance unit is an emergency call unit, in particular an eCall system. This emergency call unit can be triggered if the seat occupancy detection device detects during driving that a previously occupied seat area is no longer occupied. In the case of a motorcycle, this would mean that the driver and/or pillion passenger had come off their seat area during driving.

In particular, the electronic controller comprises a time measuring device, with the result that the assistance unit can be activated in a delayed manner. The delay ensures that the assistance unit is not triggered immediately, rather there is a wait during a certain period of time. Thus, for example in the case of a motorcycle, it can be avoided that the emergency call unit is triggered if the driver and/or the pillion passenger stand up briefly during driving and move out of the detection field of the seat occupancy detection device.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
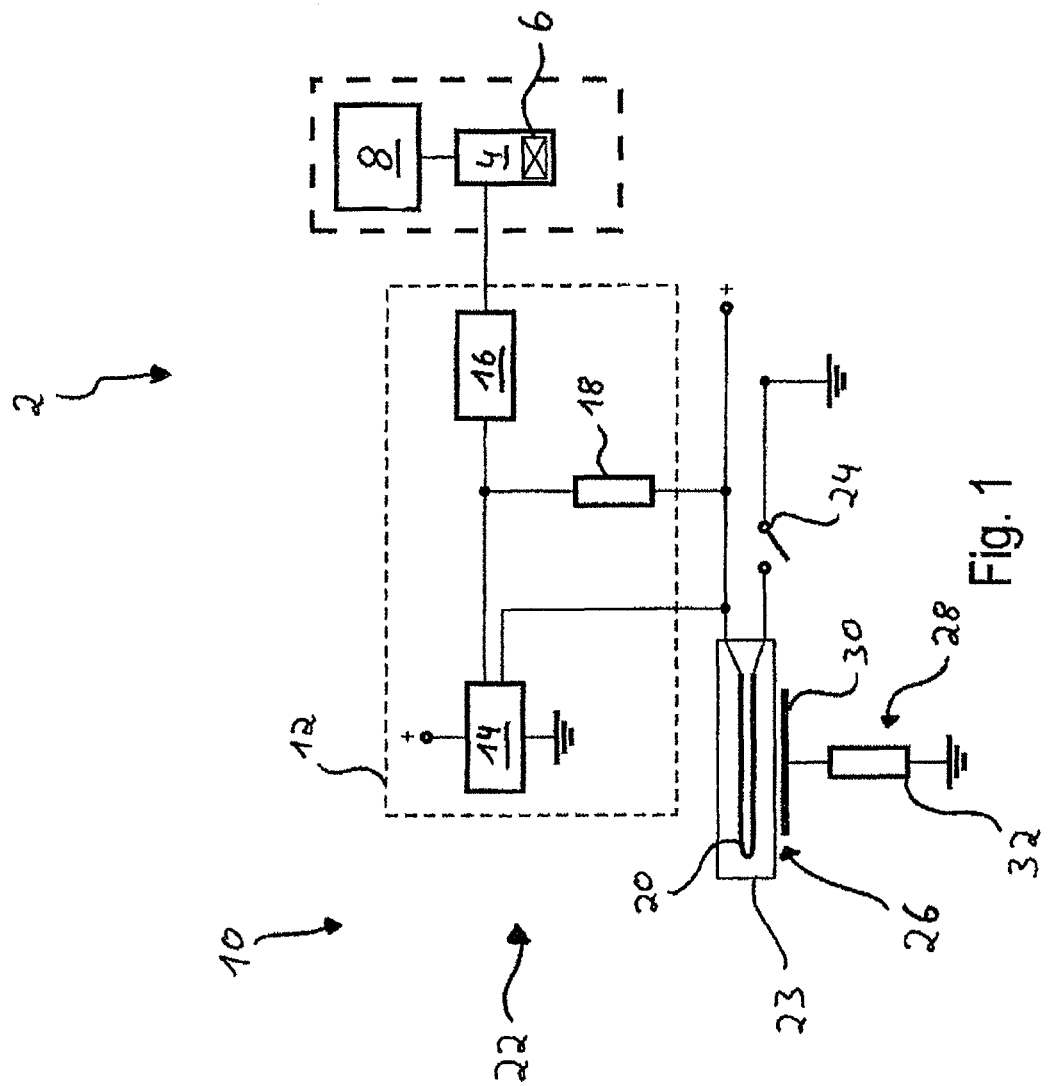
FIG. 1 is a schematic plan view of an assistance system according to the invention with a seat occupancy detection device according to the invention in a first embodiment.

FIG. 1 shows an assistance system 2 for a motorcycle, which assistance system has an electronic controller 4. The electronic controller 4 includes a time measuring device 6. Furthermore, the assistance system 2 has an assistance unit 8. The assistance unit 8 may be a chassis assistance unit, in particular an ESA system, and/or an emergency call unit, such as the eCall system.

The assistance unit 8 is activated by the electronic controller 4, wherein this occurs on the basis of a received signal of a seat occupancy detection device 10 coupled to the controller 4.

The seat occupancy detection device 10 has an electronic assembly 12, which includes a function generator 14, an evaluation unit 16 and a constant resistor 18. The resistor 18 is embodied as a thin-film resistor. The electronic assembly 12 is a part of a seat heating system 22.

The function generator 14 is also connected to a wire 20, which is a part of the seat heating system 22. The wire 20 is thus a heating wire and can warm a seat area 23 if a corresponding current flows through the wire 20.

A switch 24, which is preferably embodied as a MOSFET switch, is assigned to the wire 20 in order to guarantee fast switching times. In this case, the switch 24 can interrupt the flow of current through the wire 20, which current flows when the seat heating system 22 is activated. Thus, the switch 24 is preferably that one which activates and deactivates the seat heating system 22.

The interruption of the flow of current through the wire 20 causes the wire 20 to become an electrode, wherein the electrode is a part of a capacitor 26, provided the seat area 23 is occupied. The capacitor 26 is thus formed between the wire 20 isolated by the switch 24 and a person 28 located on the seat area 23. The person 28 forms the mating electrode 30. In this case, the person 28 is connected to the ground—the reference potential—of the motor vehicle. The person 28 forms a resistor 32 which has no effect on the functioning of the seat occupancy detection device 10, however.

Among other things, the electronic controller 4 is provided to control the switch 24 which is assigned to the wire 20. In addition, the electronic controller 4 is connected to the evaluation unit 16 of the electronic assembly 12 and obtains therefrom the evaluation of the electrical signals of the seat occupancy detection device 10. In this case, the time measuring device 6 assigned to the electronic controller 4 acquires, inter alia, the time which has passed since the signal input and correspondingly delays the activation of the assistance unit 8 by the electronic controller 4.

The electrical signal generated by the function generator 14 is damped via the resistor 18, with the result that changes through the connectable capacitor 26 are relatively great. A threshold value is stored in the evaluation unit 16, which threshold value is exceeded or undershot if the capacitor 26 is connected to the circuit or not and the person 28 is located on the seat area 23.

The electrical signal generated by the function generator 14 can be, for example, an alternating current which is generated at low frequency and is correspondingly reduced owing to the connection of the capacitor 26, since the capacitor 26 acts as frequency-dependent resistor. Alternatively, the electrical signal may also be an AC voltage signal or alternating current signal, the phases of which are correspondingly offset with respect to one another owing to the connection of the capacitor 26. Further electrical signals which are correspondingly influenced by a capacitor may likewise be used and generated by the function generator 14.

In this case, the mode of operation of the seat occupancy detection device 10 is as follows.

When the seat heating system 22 is deactivated, the switch 24 is in the open position shown in FIG. 1, as a result of which the wire 20 acts as electrode.

The function generator 14 generates an electrical signal which correspondingly changes owing to the occupancy of the seat area 23 by the person 28 and the connection, associated with said occupancy, of the capacitor 26 into the electrical circuit. In this case, the capacitor 26 is—as already mentioned above—formed by the wire 20 acting as electrode and the mating electrode 30 in the form of the person 28 connected to the ground of the vehicle.

The electrical signal changed by the capacitor 26 is correspondingly acquired by the evaluation unit 16, with the result that the electronic controller 4 obtains a signal that the seat area 23 is occupied by a person 28. The electronic controller 4 actuates the assistance unit 8.

If the person 28 should now come off the seat area 23 during driving, there is no longer a capacitor 26 in the circuit, which capacitor changes the electrical signal which has been generated by the function generator 14. As a result, the signal generated by the function generator 14 exceeds or undershoots the threshold value stored in the evaluation unit 16 and the evaluation unit 16 detects that the person 28 has left the seat area 23.

In the case mentioned above, in which the person 28 comes off the seat area 23 during driving, the electronic controller 4 activates the assistance unit 8, for example an emergency call unit, owing to the signal received by the evaluation unit 16. The activation of the assistance unit 8 is delayed in this case, however, by the time measuring device 6 since it is possible that the person 28 temporarily comes off the seat area 23 or moves out of the detection field of the electrode, for example if the person 28 stands up during driving. Thus, it is ensured that the emergency call device is not unnecessarily triggered.

The seat occupancy detection device 10 is likewise operative when the seat heating system 22 is switched on. In the case of a generally activated seat heating system 22, the switch 24 is closed, with the result that a current is applied to the wire 20, which causes the wire 20 to heat up and the seat area 23 to warm up. When the switch 24 is closed, the wire 20 cannot act as electrode of the capacitor 26, however.

Therefore, when the seat heating system 22 is activated, the electronic controller 4 controls the switch 24 such that it briefly transfers into its open position which interrupts the flow of current. In this time period when the switch 24 is open, the wire 20 acts as electrode for the capacitor 26, in a similar manner to the method above. In this time period, the occupancy of the seat area 23 by the person 28 can thus be detected, as has already been described.

Preferably, the switch 24 is in its current-interrupting position for a time period required for the evaluation unit 16 to acquire and process the electrical signal of the function generator 14.

Once the evaluation unit 16 has detected and processed the electrical signal, the switch 24 is returned to its current-conducting position by the electronic controller 4, with the result that the wire 20 acts as heating wire since current again flows through it which leads to heating-up of the wire 20 and of the seat area 23.

This switching-on and -off of the switch 24 is in this case preferably done periodically and at time intervals which ensure a sufficient heating function of the seat heating system 22. Thus, despite the activated seat heating system 22, detection of the seat occupancy using the same components is possible.

Figure 2:
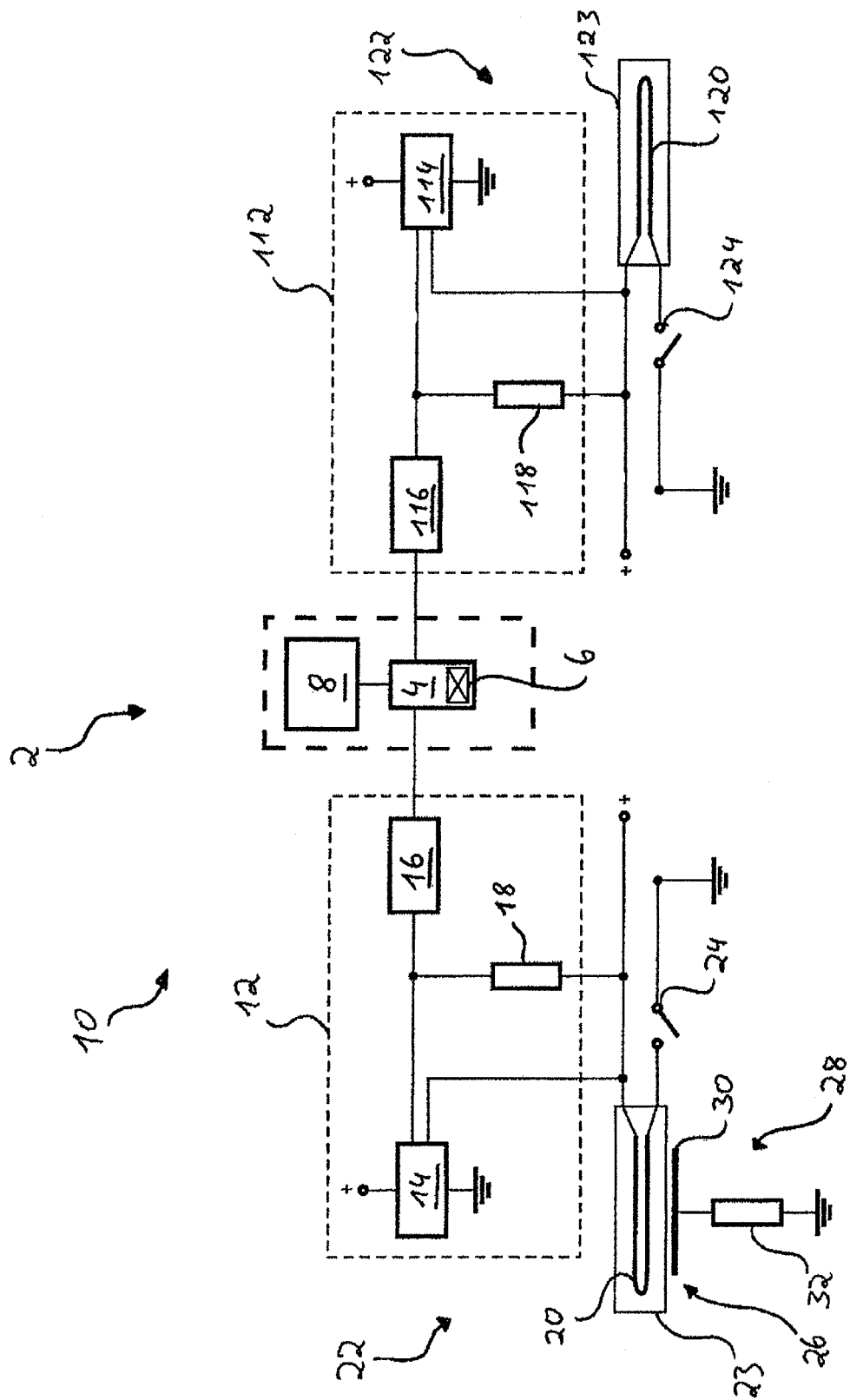
FIG. 2 is a schematic plan view of an assistance system according to the invention with a seat occupancy detection device according to the invention in a second embodiment.

FIG. 2 shows a second embodiment of the assistance system 2, wherein the seat occupancy detection device 10 can be considered an extension of the seat occupancy detection device 10 known from FIG. 1, since the seat occupancy detection device 10 in FIG. 2 is assigned to two seat areas 23 and 123. By way of example, the first seat area 23 is the driver's seat area and the second seat area 123 is the pillion seat area of a motorcycle. The same reference signs are used for the components known from FIG. 1, wherein structurally identical and functionally identical components which are assigned to the pillion seat area 123 are correspondingly increased by 100.

As shown in FIG. 2, only a driver 28 is located on the driver's seat area 23, whereas the pillion seat area 123 is not occupied.

In each case, an electronic assembly 12, 112 is assigned to the two seat areas 23, 123, which electronic assemblies are identically designed and have in each case a function generator 14, 114, an evaluation unit 16, 116 and a resistor 18, 118.

A wire 120 is provided in a similar manner to the embodiment described in FIG. 1, which wire can firstly act as electrode of a capacitor and as heating wire, as a result of which the wire 120 is likewise a part of a seat heating system 122 which is assigned to the pillion seat area 123. The flow of current through the wire 120 can be interrupted via a switch 124, with the result that the wire 120 can also act as electrode for a second capacitor of the seat occupancy detection device 10—despite the activated seat heating system 122—in a similar manner to the embodiment in FIG. 1. The second capacitor is formed when the pillion seat area 123 is occupied by a pillion passenger.

The two evaluation units 16, 116 are connected to the same electronic controller 4, which is a part of the assistance system 2 and correspondingly activates, deactivates or adjusts the assistance unit 8.

The assistance unit 8 is, for example, a chassis assistance unit, in particular an ESA system, which adjusts the chassis of the motorcycle corresponding to the occupancy of the seat area 23 and the pillion seat area 123, with the result that the chassis is adjusted to the occupancy by one person 28 or two people.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A seat occupancy detection device for a motor vehicle, comprising:
 at least one electrode of a capacitor, which electrode is arranged in a seat area and is embodied as a wire;
 an electronic assembly connected to the wire, which electronic assembly has a function generator for generating an electrical signal, and an evaluation unit; and
 a switch located between the wire and a seat heating power supply, the switch being configured to be controlled by the electronic assembly,
 wherein
 the electrical signal generated by the function generator is changeable by occupancy of the seat area,
 the switch is operable to interrupt a heating current from the power supply to the wire in response to a command from the electronic assembly, and
 the electronic assembly is configured to apply the generated electrical signal to the wire and determine using the evaluation unit whether the seat area is occupied during a period in which the heating current from the power supply is interrupted by the switch, and to command the switch to allow flow of the heating current from the power supply to the wire after applying the generated electrical signal to the wire.

2. The seat occupancy detection device according to claim 1, wherein the motor vehicle is a motorcycle.

3. The seat occupancy detection device according to claim 2, wherein the wire is a part of a seat heating system and the wire is a heating wire.

4. The seat occupancy detection device according to claim 1, wherein the wire has a heating current alternately applied thereto and acts as the electrode of the capacitor.

5. The seat occupancy detection device according to claim 1, wherein the switch is a MOSFET switch.

6. The seat occupancy detection device according to claim 1, further comprising an electronic controller.

7. The seat occupancy detection device according to claim 1, wherein the electronic assembly has a constant resistor embodied as a thin-film resistor.

8. The seat occupancy detection device according to claim 1, wherein at least two wires, two electronic assemblies and two seat areas are provided, in each case one wire and one electronic assembly being assigned to one seat area for independent determination of the seat occupancy of each seat area.

9. An assistance system for a motor vehicle, comprising:
 a seat occupancy detection device comprising
 at least one electrode of a capacitor, which electrode is arranged in a seat area and is embodied as a wire;
 an electronic assembly connected to the wire, which electronic assembly has a function generator for generating an electrical signal, and an evaluation unit; and a switch located between the wire and a seat heating power supply, the switch being configured to be controlled by the electronic assembly,
wherein
the electrical signal generated by the function generator is changeable by occupancy of the seat area,
the switch is operable to interrupt a heating current from the power supply to the wire in response to a command from the electronic assembly, and
the electronic assembly is configured to apply the generated electrical signal to the wire and determine using the evaluation unit whether the seat area is occupied during a period in which the heating current from the power supply is interrupted by the switch, and to command the switch to allow flow of the heating current from the power supply to the wire after applying the generated electrical signal to the wire, and
an electronic controller, which electronic controller activates or deactivates an assistance unit depending on the occupancy of the seat area determined by the evaluation unit.

10. The assistance system according to claim 9, wherein the assistance unit is a chassis assistance unit.

11. The assistance system according to claim 9, wherein the assistance unit is an emergency call unit.

12. The assistance system according to claim 10, wherein the assistance unit is an emergency call unit.

13. The assistance system according to claim 9, wherein the electronic controller comprises a time measuring device, by which the assistance unit is activatable in a delayed manner on the basis of the obtained signals of the seat occupancy detection device.

14. The assistance system according to claim 11, wherein the electronic controller comprises a time measuring device, by which the assistance unit is activatable in a delayed manner on the basis of the obtained signals of the seat occupancy detection device.

15. The assistance system according to claim 9, wherein the motor vehicle is a motorcycle.

* * * * *